United States Patent

Roth et al.

[11] Patent Number: 5,284,242
[45] Date of Patent: Feb. 8, 1994

[54] FOLDING PAPERBOARD PACKAGE

[75] Inventors: Richard Roth; Paul D. Miller, both of New York, N.Y.

[73] Assignee: Queens Group, Inc., Long Island, N.Y.

[21] Appl. No.: 904,342

[22] Filed: Jun. 22, 1992

[51] Int. Cl.5 .............................................. B65D 85/57
[52] U.S. Cl. .................................... 206/310; 206/309; 206/312; 206/472
[58] Field of Search ............... 206/309, 310, 311, 312, 206/387, 444, 472, 313

[56] References Cited

U.S. PATENT DOCUMENTS

| | | |
|---|---|---|
| 3,489,919 | 3/1975 | Elliot et al. |
| 3,556,391 | 1/1971 | Kosterka . |
| 3,870,223 | 1/1976 | Wyant . |
| 4,176,744 | 12/1979 | Borzak . |
| 4,327,831 | 5/1982 | Inaba . |
| 4,488,645 | 12/1984 | Yamaguchi . |
| 4,566,590 | 1/1986 | Manning et al. . |
| 4,614,269 | 9/1986 | Dietze et al. ............... 206/387 |
| 4,623,062 | 11/1986 | Chase . |
| 4,643,301 | 2/1987 | Hehn et al. ............... 206/387 |
| 4,709,812 | 12/1987 | Kosterka . |
| 4,802,601 | 2/1989 | Pijanowski et al. ............... 206/444 |
| 4,994,954 | 9/1987 | Moss . |
| 5,101,971 | 4/1992 | Grobecker ............... 206/232 |
| 5,121,834 | 6/1992 | Tissembaum ............... 206/472 |
| 5,188,230 | 2/1993 | O'Brien et al. ............... 206/312 |

FOREIGN PATENT DOCUMENTS

| | | |
|---|---|---|
| 2091692 | 1/1981 | United Kingdom . |
| 2141998 | 1/1985 | United Kingdom . |
| 2147262 | 5/1985 | United Kingdom . |
| 2219573 | 12/1985 | United Kingdom . |

Primary Examiner—David T. Fidei
Attorney, Agent, or Firm—Ostrolenk, Faber, Gerb & Soffen

[57] ABSTRACT

A package structure for a recording medium or other items is composed of a plastic support frame and a laminated flexible body. The package structure consists of a molded plastic frame having two sections forming the lid and the base of the package, separated by a hinge which allows the lid and base sections to fold together to close the package. In a preferred embodiment, the package body is formed of a folded paperboard blank. The plastic frame is slotted at opposite ends to allow the paperboard blank to extend through the frame from outside to inside. The blank is folded at the slots, and is folded onto itself to form the surfaces of the package. The frame is formed with recesses adapted to receive the body surfaces to protect the surfaces and the edges of the outer body surfaces. The portions of the body which respectively form the inner and outer surfaces of the lid, and the inner and outer surfaces of the base are secured together and/or to the corresponding frame section. A portion of the body overlies, but is not secured to the frame hinge so that the two move separately when the package opens and closes.

24 Claims, 10 Drawing Sheets

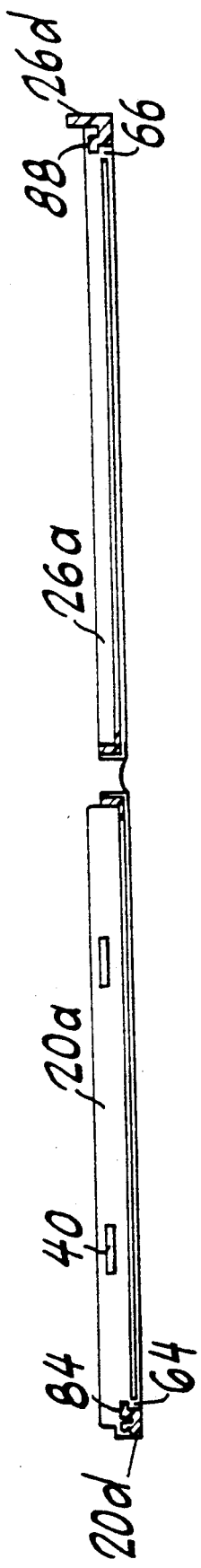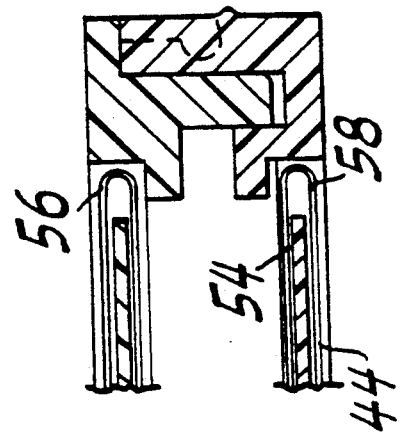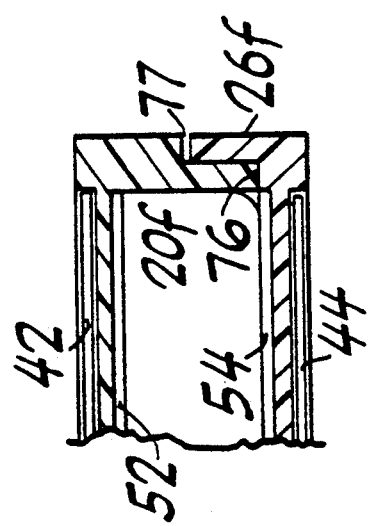

FOLDING PAPERBOARD PACKAGE

BACKGROUND OF THE INVENTION

1. Field Of The Invention

This invention relates to a package structure and, more particularly, to a package structure having a plastic support frame laminated to a body of folded sheet material to form the package surfaces. It is particularly suited for but not limited to a package for optically readable media such as compact audio discs, CD ROM's, for any other items.

2. Description Of The Related Art

Traditionally, compact audio discs (CDs), have been packaged in clear plastic boxes, popularly called "jewel boxes." Suitable graphics and information for the consumer are printed on sheets placed inside, or between panels of the jewel box, and on booklets inserted inside the box.

To discourage theft, and to accommodate existing display facilities, jewel boxes have usually been packaged in large cardboard containers, or alternatively, in semi-rigid plastic shells. In both cases, the outer containers are intended to be discarded after purchase.

Popular protest about the environmental inefficiency of traditional packaging led to development of several alternatives allowing sale with the container in an open position and eliminated some of the excess packaging material. These enjoyed brief success, but the music industry is yielding to demands for no excess packaging and CD's will ultimately be sold in plastic film wrapped jewel boxes closed to their normal storage size.

Yet dissatisfaction still exists.

One problem is that the traditional jewel box consumes a relatively large amount of plastic which is not customarily derived from recycled materials. Another problem is that package graphics will play an important point of sale advertising role if the jewel box is not in an outer package. Viewing the printed material through the jewel box detracts significantly from the color and "snap" of the graphics. Graphic impact is further reduced due to distracting reflections generated by the plastic surface.

A further problem is that the jewel box is rather fragile. The surfaces, and particularly, the hinges, can easily break if the package is dropped.

Some of the better designs which resulted from earlier consumer demand for environmentally better packaging involved folded paperboard. Unfortunately, these packages have generally not been durable, particularly along the exposed paperboard edges, and at the folds, or have suffered from the need for expensive special purpose machinery both to assemble the package and to load the CD and accompanying booklet. There is clearly still the need for a package structure that overcomes the known problems with prior paper packages and with the traditional CD jewel box design.

SUMMARY OF THE INVENTION

The present invention meets these needs by providing a package structure comprised of a plastic support frame laminated between the surfaces of a blank formed of folded sheet material. The frame consists of two sections, corresponding to the base and lid of the package. The frame sections are hinged together so the base and lid fold together to close the package. A latching mechanism keeps the package from opening unintentionally.

In the preferred embodiment, the package surfaces are formed of a single, multiple-fold paperboard blank. In such an embodiment, the plastic base and lid are slotted at the ends opposite the hinge. The paperboard blank is about twice as long as the package in its open condition, and is folded transversely at the locations of the slots.

When assembled, the central portion of the paperboard blank extends along the front surface of the lid section and the back surface of the base section. One end of the blank projects through the slot in the lid section and folds over onto itself with the lid section sandwiched between the paperboard surfaces to form the inner surface of the package lid. The other end projects through the slot in the base section and folds over onto itself, again, with the base section sandwiched between the paperboard surfaces to form the inner surface of the package base. The inner and outer paperboard surfaces are glued together and/or to the frame to provide the final assembly and structure of the package.

Both lid and base frame sections include marginal walls extending out of the plane of the respective frame sections, and are recessed to a depth which is slightly greater than the thickness of the paperboard. When the package is assembled, the portions of the paperboard blank which form the outer faces of the package lid and base are positioned within the recess. In this way, a plastic rim is provided which protects the edges of the paperboard on the outside of the package. At the same time, the rim protects the paperboard surfaces against scuffing from contact with other surfaces such as a table top, or the surfaces of other CD packages when several packages are stored on top of or next to each other.

A central hub or spindle, preferably designed to mount the compact disc, so its information bearing surface is not in contact with the package surface, is also provided. The spindle is secured to or integral with the base section, and extends through an aligned opening in the inside face of the base portion of the paperboard blank into the CD storage area. Retaining means such as plastic tabs, runners or rails are further provided on the lid section of the support frame to hold any booklet or other material that is desired to be inserted into the package.

In one embodiment, the lid and base sections are essentially open in the center, and include ledges located adjacent to the slots along the edge remote from the hinged area. Folded edges of the blank rest on these ledges to provide additional stability and integrity for the package.

In an alternate embodiment, the central area of the lid and base sections may be wholly or partially filled in to provide added rigidity.

It is an advantage of the present invention that existing machinery used for loading compact discs and booklets into the standard jewel box can be used for the present package as well. The jewel box and the new package can therefore be used interchangeably without the need to invest in expensive new machinery.

It is a further advantage of the present invention that the graphics to be displayed on the package can be printed on the outer paperboard surfaces. This improves the color and clarity of the graphic images compared to the traditional jewel box design where the images are viewed through the plastic. Furthermore, because the package surfaces are made of paperboard, the package is amenable to a range of finishing processes such as embossing which could not otherwise be employed.

Additionally, because the plastic components are only used for internal structural support and as protection for the outer edges and surfaces of the paperboard, there is no need to use high quality transparent virgin plastic for aesthetic purposes. Accordingly, both the plastic structure and the paperboard can be made of recycled and recyclable materials.

Yet anther advantage of the present invention is that because the package consists of fewer components than the traditional jewel box, it lends itself to faster and more economic production, assembly and loading.

Other objects, advantages and novel features of the present invention will become apparent from the following detailed description of the invention when considered in conjunction with the accompanying drawings.

BRIEF DESCRIPTION OF THE DRAWINGS

FIG. 5 is side sectional view of the support frame shown in FIG. 4, taken along position line 5—5.

FIG. 6C is a composite of FIGS. 6A and 6B showing the configuration of one end of the frame when the package is assembled and closed.

FIG. 7C is a composite of FIGS. 7A and 7B showing the configuration of the top and bottom of the frame when the package is in assembled and closed condition.

DETAILED DESCRIPTION OF THE DRAWINGS

Figure 1:
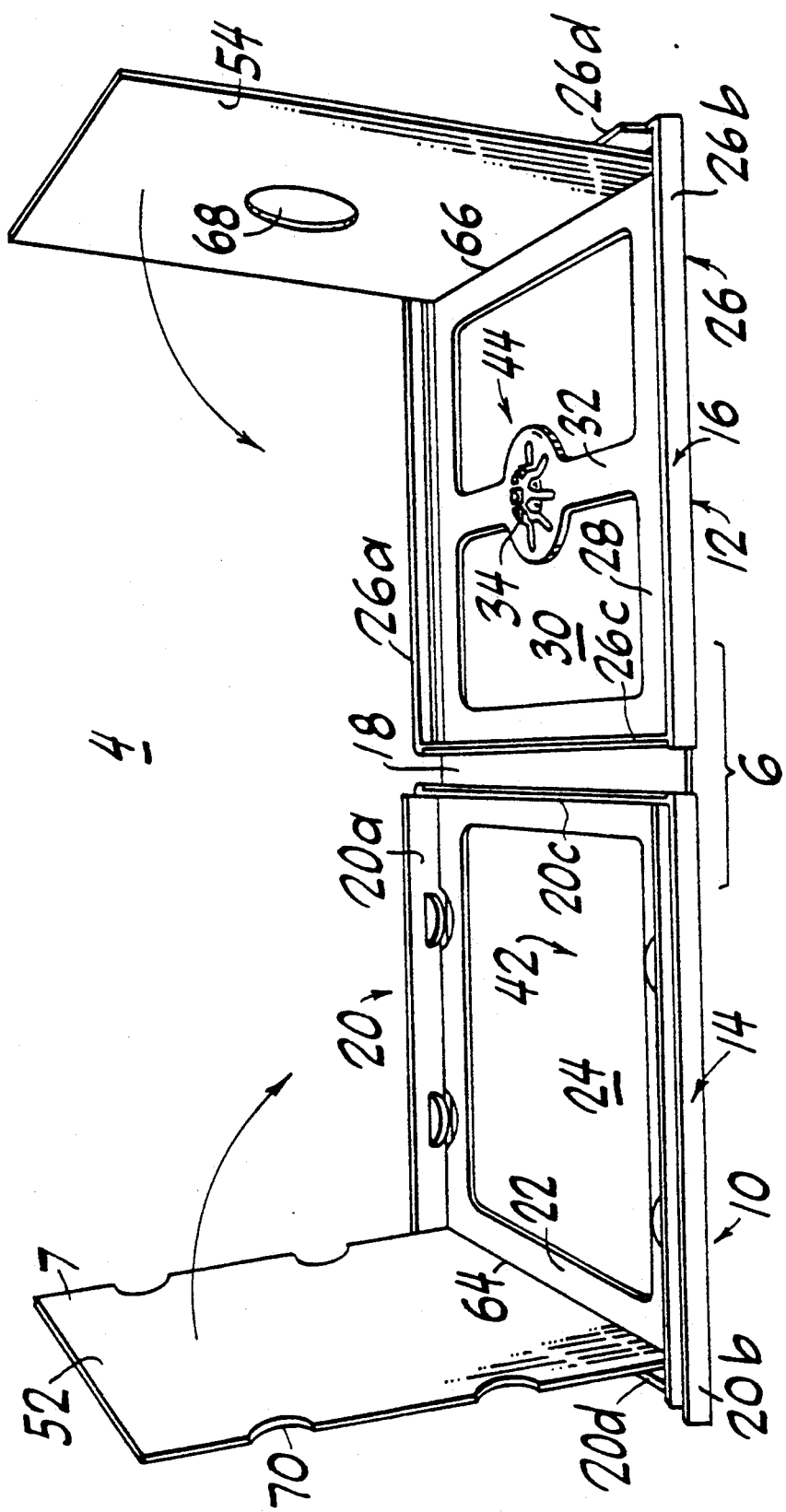
FIG. 1 is a perspective view of a preferred embodiment of the package structure of the present invention in an open and partially assembled condition.

Referring to FIG. 1, there is shown a perspective view of the package structure according to the present invention, generally denoted at 4, in an open and partially assembled condition. In the preferred embodiment, package 4 is comprised of a molded plastic frame generally denoted by 6, and a folded paperboard body generally denoted 7. Together, these form the lid and base sections 10 and 12, respectively of the completed package.

Figure 2:
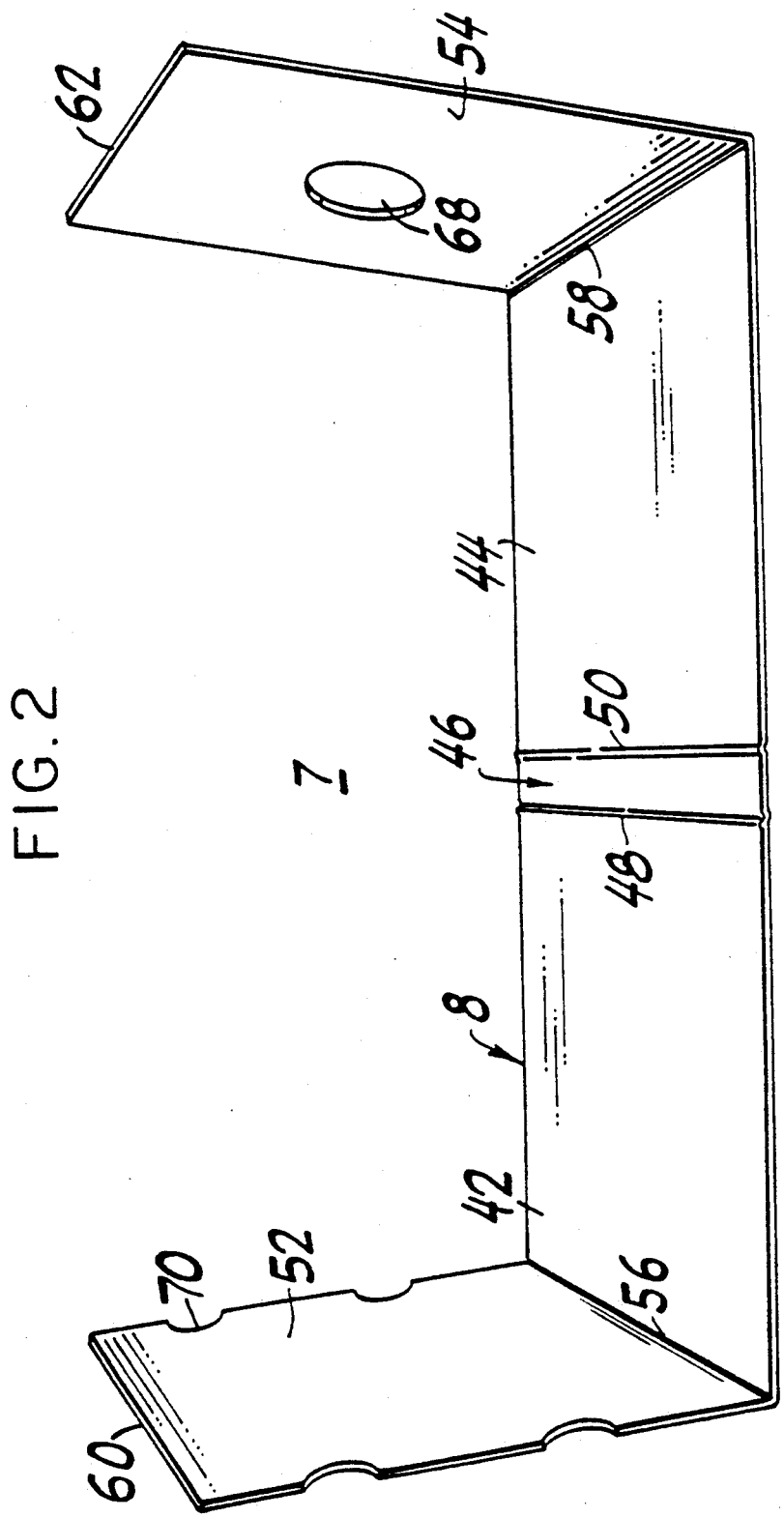
FIG. 2 is a perspective view of the paperboard packaging surface of the present invention shown in FIG. 1 in an unfolded condition.

Referring to FIG. 2, in the preferred embodiment, paperboard body 7 is formed from a single blank 8 which is die-cut to the proper size and configuration. Blank 8 may be of any thickness suitable to the particular application. For a compact audio disc container, this may be in the range of about 0.014" to about 0.020".

Blank 8 is comprised of first and second surface segments 42 and 44, which form the outer faces of lid 10 and base 12 respectively. Segments 42 and 44 are separated by a hinge or spine segment 46 which overlies hinge 18 in the assembled package. Segment 46 is defined by a pair of fold areas generally denoted at 48 and 50 and described in more detail below.

Blank 8 is further comprised of a third segment 52 which forms the inner face of lid 10, and of a fourth segment 54 which forms the inner face of base 12. Segments 42 and 52 are separated by a fold line 56 while segments 44 and 54 are separated by a fold line 58. The distance from fold line 56 to the end 60 of segment 52 is slightly less than the distance between fold lines 48 and 56. Similarly, the distance from fold line 58 to the end 62 of segment 54 is slightly less than the distance between fold lines 50 and 58.

Referring again to FIG. 1, frame 6 includes a lid section 14 and a base section 16. The lid and base sections 14 and 16 are coupled together along their adjacent edges by a hinge 18. This may be integrally molded with the frame, or formed separately and secured to the frame by sonic or solvent welding, or mechanically by snapping it into place.

As illustrated, lid section 14 includes a peripheral wall 20 extending out of the plane of the frame, and a planar rib 22 which defines the periphery of a central opening 24.

Base section 16 similarly includes a peripheral wall 26 extending out of the plane of the frame, and a planar rib 28 which defines a central opening 30. This, however is divided by an additional transverse rib 32, which carries a mounting spindle shown schematically at 34 on which the compact disc is supported.

Spindle 34 may be of any desired configuration, but is preferably of the general type used in the conventional jewel box. This permits the compact disc to be supported only at the center, with the remainder of the disc isolated from contact with the interior of the package. Alternatively, additional supporting members may be molded into base section 16 if desired.

While the traditional jewel box is constructed of a highly transparent material such as ABS, the decorative aspects of frame 6 are only minimal. It may therefore be formed, for example, by injection molding, from a wide range of suitable materials, including recycled polycarbonate, polystyrene, or polypropylene. For a compact audio disc package, the thickness of the frame material may be in the range of 0.030" to 0.125", except for certain portions of the walls, for which particular dimensional relationships are required, as described more fully below. The overall frame size will, of course, depend on the application.

Figure 4:
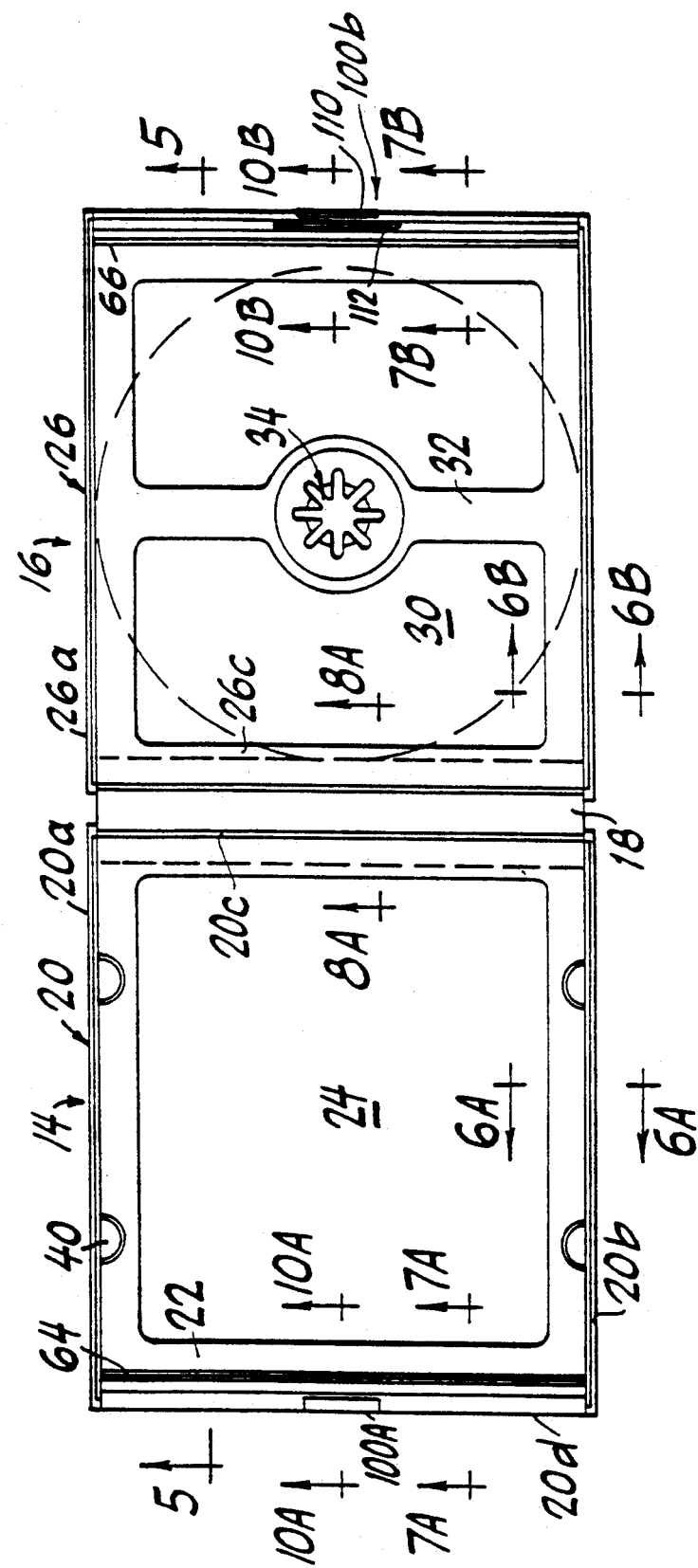
FIG. 4 is an interior view of the support frame of the embodiment of the invention shown in FIG. 1.
Figure 6B:
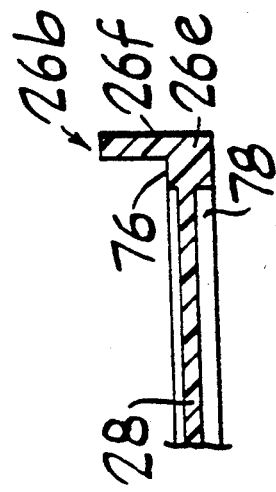
FIGS. 6A and 6B are cross-sectional views, taken along respective lines 6A—6A and 6B—6B in FIG. 4 showing the configuration of portions of the lid and base frames of the present invention.
Figure 6A:
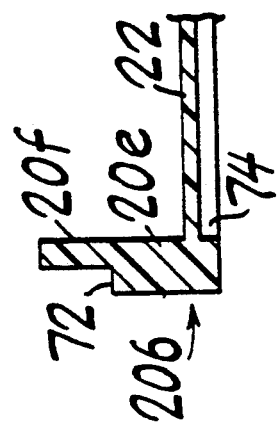

Referring to FIGS. 1, 4 and 5, the wall 20 of lid frame section 14 is comprised of a top wall section 20a, a bottom wall section 20b, a hinge or spine wall section 20c and a front wall section 20d. As illustrated in FIG. 6A, bottom wall section 20b is of a generally rectangular cross section and is relieved at 72 to define a first rectangular portion 20e and a second offset rectangular portion 20f. Rib 22 extends from wall portion 20e slightly offset from the end to form a recess 74. This will receive the portion of paperboard blank 8 which forms the outer surface of lid 10 when the package is assembled. Top wall section 20a is similarly constructed.

Referring still to FIGS. 1, 4 and 5, the wall 26 of base section 16 is comprised of a top wall section 26a, a bottom wall section 26b, a hinge or spine wall section 26c and a front wall section 26d. As illustrated in FIG. 6B, bottom wall section 26b is also of generally rectangular cross section and is relieved at 76 to define a first rectangular portion 26e and a second offset rectangular portion 26f. Like rib 22, rib 28 extends from wall portion 26e slightly offset from the end to form a recess 78. This will receive the portion of blank 8 which forms the outer surface of base 12 when the package is assembled. Top wall section 26a is similarly constructed.

As shown in FIG. 6C, the dimensions of the parts described in connection with FIGS. 6A and 6B are selected so that lid and frame sections 14 and 16 mate along relief line 76 when the package is closed. Rectangular element 26f, however, is slightly shorter than element 20f. This defines a small gap or reveal 77 between the lid and base sections along the top and bottom of the frame. This serves to minimize the criticality of linear dimensions in the molding process, as will be understood by those skilled in the art.

Figure 7B:
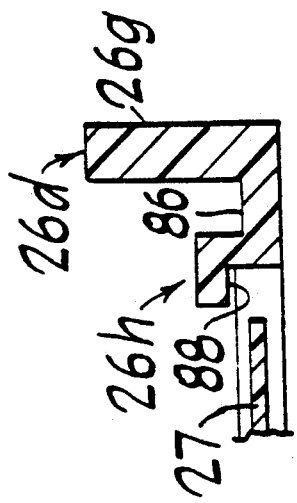
FIGS. 7A and 7B are cross-sectional views, taken along respective lines 7A—7A and 7B—7B in FIG. 4 showing the configuration of the other portions of the lid and base frames of the present invention.
Figure 7A:
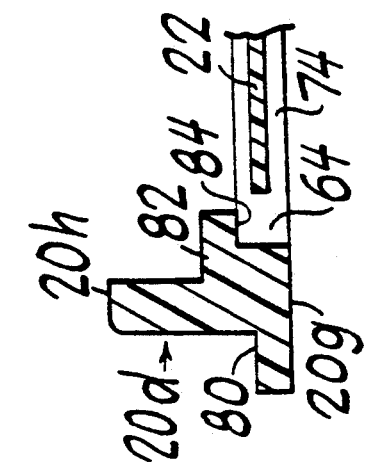

Referring to FIG. 7A, front wall section 20d of base section 14 is comprised of a pair of segments 20g and 20h. Segment 20g is generally rectangular and is relieved at 80 to form a first generally L-shaped segment. Segment 20h is also generally L-shaped and extends laterally toward the spine end of lid section 14. Segment 20h includes a portion 82, the under surface of which defines a ledge 84 which partially blocks slot 64 at the end of rib 22. As previously described, rib 22 is slightly offset from wall 20 to form the portion of recess 74 located in the vicinity of wall section 20d. The depth of recesses 74 and 78 (see FIGS. 6A and 6B) are slightly greater than the thickness of the paperboard blank so that the paperboard surfaces remain within the outer boundaries of the frame.

Referring to FIG. 7B, front wall section 26d of base frame section 16 is comprised of a pair of segments 26g and 26h, each of generally L-shaped cross section. Together, these define a groove 86 which receives the end of lid frame wall segment 20h when the package is closed, and also a ledge 88 adapted to partially block slot 66 at the end of rib 28. Rib 28 is slightly offset from wall 26 to form the portion of recess 78 located in the vicinity of wall section 26d. The dimensions of the parts described in connection with FIGS. 7A and 7B are selected so that lid and base sections 14 and 16 mate when the package is closed, as illustrated in FIG. 7C.

Also, because ledges 84 and 88 partially block slots 64 and 66, they provide structural support for the paperboard along the slots, as described more fully below.

Figure 10B:
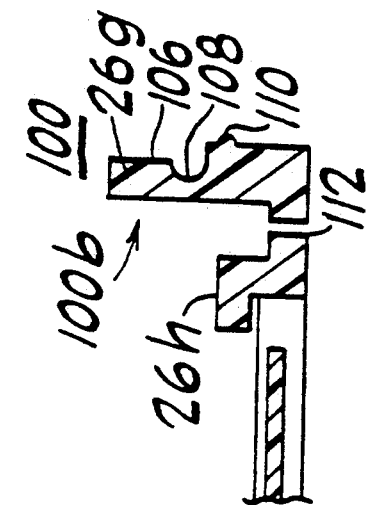
FIG. 10B is a cross-sectional view taken along line 10B—10B in FIG. 4 showing the details of the base portion of the latch shown in FIG. 10A.
Figure 10A:
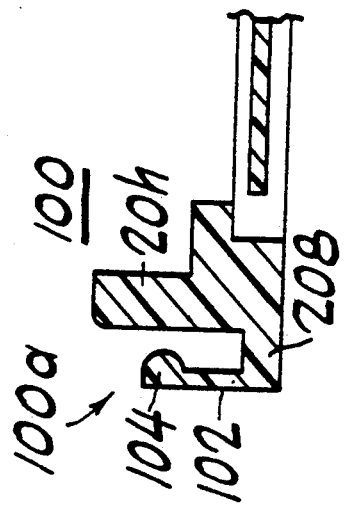
FIG. 10A is a cross-sectional view taken along line 10A—10A in FIG. 4 showing the details of the lid portion of a latch according to one embodiment of the invention.

Located midway between top and bottom wall sections along front wall sections 20d and 26d of lid and base sections 14 and 16, is a latch mechanism to keep the package from opening unintentionally. FIGS. 10A and 10B show this in detail. In the lid, latch portion 100A consists of a generally rectangular latch plate 102 which terminates in a laterally projecting boss 104 (see FIG. 10A). On the base, (see FIG. 10B) wall section 26g is relieved at 106 to receive latch plate 102. Boss 104 fits into a detent 108 within relieved area 106.

When the package is closed, latch parts 100A and 100B snap together. To open the package, means such as a button or indicator 110 is provided for the user to push against. A generally rectangular groove or passage 112 is cut through the base of wall section 26g. This allows the wall section to compress, which causes boss 104 to be released from detent 108, and the lid can be pivoted away from the base to open the package.

When the package is closed, lid section 14 and base section 16 of frame 6 fold together at hinge 18. This is preferably what is known as a "living hinge," i.e, a section of material which is flexible in an area of intended folding to prevent cracking or tearing when the hinged parts are opened and closed.

Figure 8A:
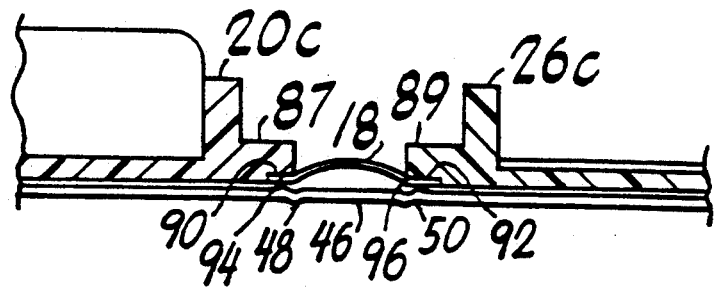
FIG. 8A is an expanded fragmentary view of FIG. 5, taken along line 8A—8A in FIG. 4 showing the construction and attachment of the frame hinge according to one embodiment of the invention with the frame open.
Figure 8B:
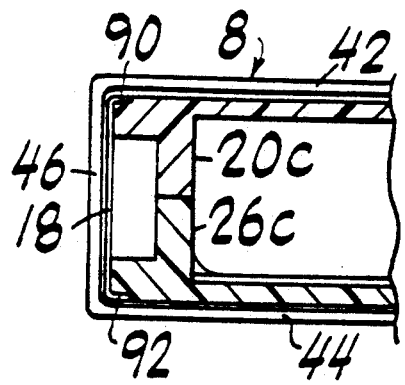
FIG. 8B is an expanded fragmentary view showing the hinge of FIG. 8A with the frame closed.

Referring to FIGS. 8A and 8B, in a preferred embodiment, hinge wall sections 20c and 26c are of generally L-shaped cross-section, with opposed portions 87 and 89 recessed at 90 and 92, respectively. The hinge itself is formed of any suitable material and is secured within recesses 90 and 92 by sonic or solvent welding. The hinge is molded with a predetermined transverse bow so that when the frame is open, as in FIGS. 5 and 8A, hinge 18 is bowed inwardly along its length. When the frame is closed, as in FIG. 8B, the hinge is essentially flat. Hinge 18 may also be scored, or thinned in any other suitable manner along lines 94 and 96. The paperboard is not secured to the hinge, as explained more fully below.

Figure 9B:
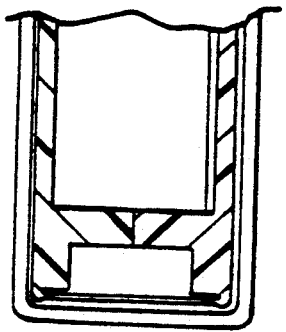
FIGS. 9A and 9B are expanded fragmentary views corresponding to FIGS. 8A and 8B showing the construction and attachment of a frame hinge according to another embodiment of the invention.
Figure 9A:
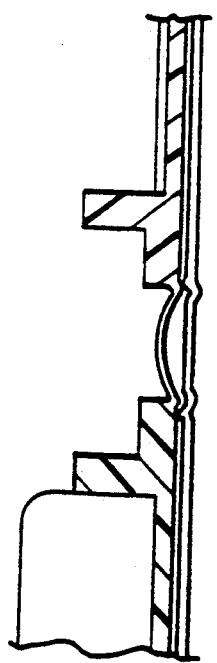

FIGS. 9A and 9B illustrate an alternative embodiment for hinge 18. Here, the hinge is integrally molded with the lid and base sections as a unitary structure.

Figure 11:
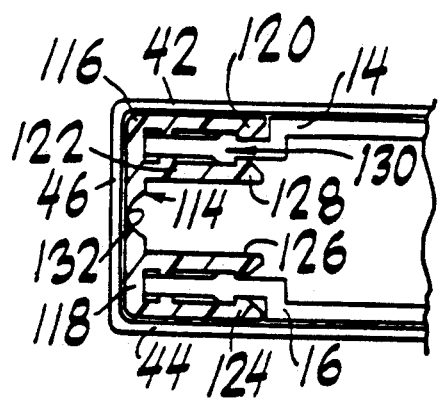
FIG. 11 is a cross-sectional view of another embodiment of a hinge structure according to the invention.

FIG. 11 illustrates, in cross-section, yet another embodiment for hinge 18. Here, the hinge is in the form of a U-shaped molded polypropylene clip 114 having two legs 116 and 118 adapted to engage with lid and base sections 14 and 16, respectively. Leg 116 is constructed of a pair of opposed prongs 120 and 122. Leg 118 is similarly constructed of prongs 124 and 126. Prongs 122 and 126 terminate in an inwardly projecting barb 128 which cooperates with suitable projections 130 on wall sections 20c and 26c. Legs 116 and 118 are connected by a central portion 132 which is thinned in the center to permit the hinge to flex.

Upon assembly, the hinge is slipped onto the projecting portions 130 of wall sections 20c and 26c of the lid and base frame sections 14 and 16. Barbs 128 lock onto the frame sections to prevent the and the hinge from becoming separated.

Another important feature of the present invention is that the inner surface of hinge portion 46 of blank 8 is not glued to the outer surface of frame hinge section 18. This allows the plastic and paperboard portions to move freely relative to each other when the package is opened and closed. Referring again to FIGS. 8A and 8B, fold areas 48 and 50 are scored on one or both sides of blank 8 to allow the paperboard spine segment 46 to deform outwardly, i.e. away from plastic hinge section 18, when the package is opened. If desired, the scoring on opposite sides of blank 8 may be slightly offset. This takes up any longitudinal stress which would tend to deform the adjacent portions of the outer lid and base segments 42 and 44 of the paperboard body. Because the plastic and paperboard spine portions 18 and 46 are not secured together, the paperboard assumes a generally flat surface configuration when the package is closed. This facilitates visibility of any printing in this area, an important benefit when several packages are stacked together for storage.

Figure 3:
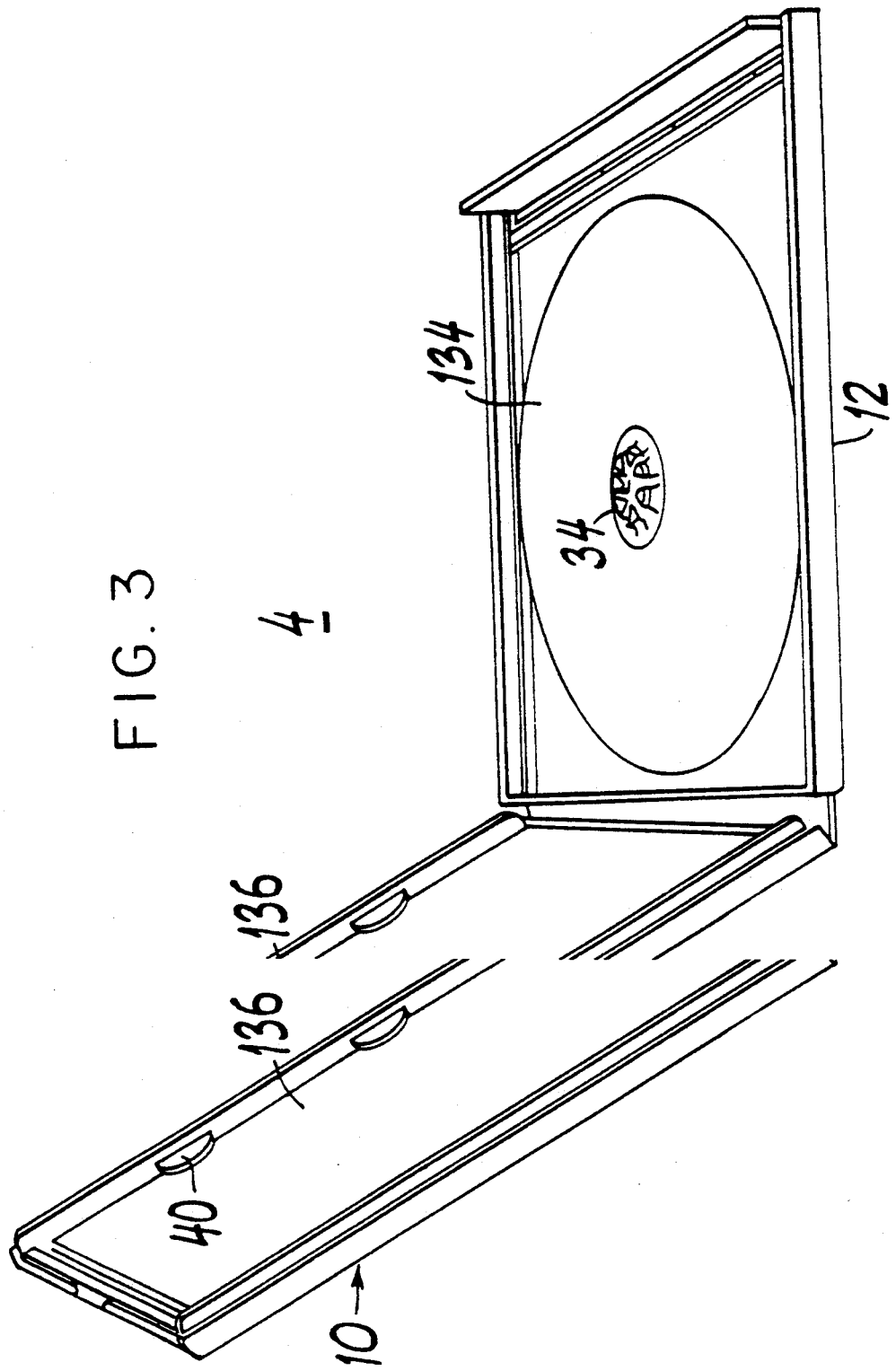
FIG. 3 is a perspective view of the embodiment shown in FIG. 1 in an assembled and partially open condition.

Referring to FIGS. 1, 2 and 3, during assembly, frame 6 is positioned on sections 42 and 44 of paperboard blank 8. The distance between fold lines 56 and 58 corresponds to the distance between slots 64 and 66, so that end portions 52 and 54 of blank 8 extend through slots 64 and 66 from the outside to the inside of the package. As illustrated n FIG. 7C, the length of paperboard blank 8 is sufficient that when the blank is folded, the portions of the blank adjacent to folds 56 and 58 are in contact with ledges 84 and 88. This provides added rigidity to the package surfaces even though lid and base sections 14 and 16 are essentially skeletal.

The mating surfaces of paperboard segments 42 and 52 are glued to each other, and to rib 22. Similarly, the mating surfaces of paperboard segments 44 and 54 are glued together, and to ribs 28 and 32. In this way, a composite package is formed, comprised of a lid and a base, each having inner and outer surfaces formed of paperboard sandwiched around a molded frame. The margins of the paperboard body 7 lie wholly within the boundaries of frame walls 20 and 26 (except along the edge of hinge portion 46) thereby protecting against damage due to mishandling or prolonged use.

As illustrated in FIG. 3, when package 4 is loaded, a compact disc 134 is positioned on spindle 34, a booklet 136 is inserted behind tabs 40, and the lid 10 is closed onto base 12. The visible paperboard surfaces are preprinted and/or embossed, or otherwise finished to provide the desired graphics on the inner and outer surfaces of the lid and base. As previously noted, standard high-speed machinery already in use in the industry can be used to load the new package interchangeably with the traditional jewel box.

Although the invention has been described as a specific package configuration for a compact audio disc, alternatives designs and applications will be readily apparent.

One obvious alternate would be to form the package without a spindle, or with another mounting device to accommodate items such as removable data storage media for computers or video games, audio or video cassettes, and even cosmetics, books or other products. The paperboard blank would be glued directly to the planar surfaces of the lid and base sections 14 and 16 rather than to each other.

Another alternative would be to construct the package to accommodate more than a single CD or other items. In such an embodiment, several molded frame members could be provided, each having a suitable mounting device. A modified hinge would provide means for attaching the additional frame members to the inside of the package, in the manner of pages in a book.

As a further alternative, the spindle could be separate from the base section. In that case, transverse rib 32 could be dispensed with, and the spindle would simply be sandwiched between, and glued to, the inner and outer sections 44 and 54 of blank 8, with the spindle projecting through opening 68 in blank section 54.

Obviously, the package structure 4 can be of rectangular or other configuration, rather than square when necessary for accommodating articles other than compact audio discs.

Figure 12:
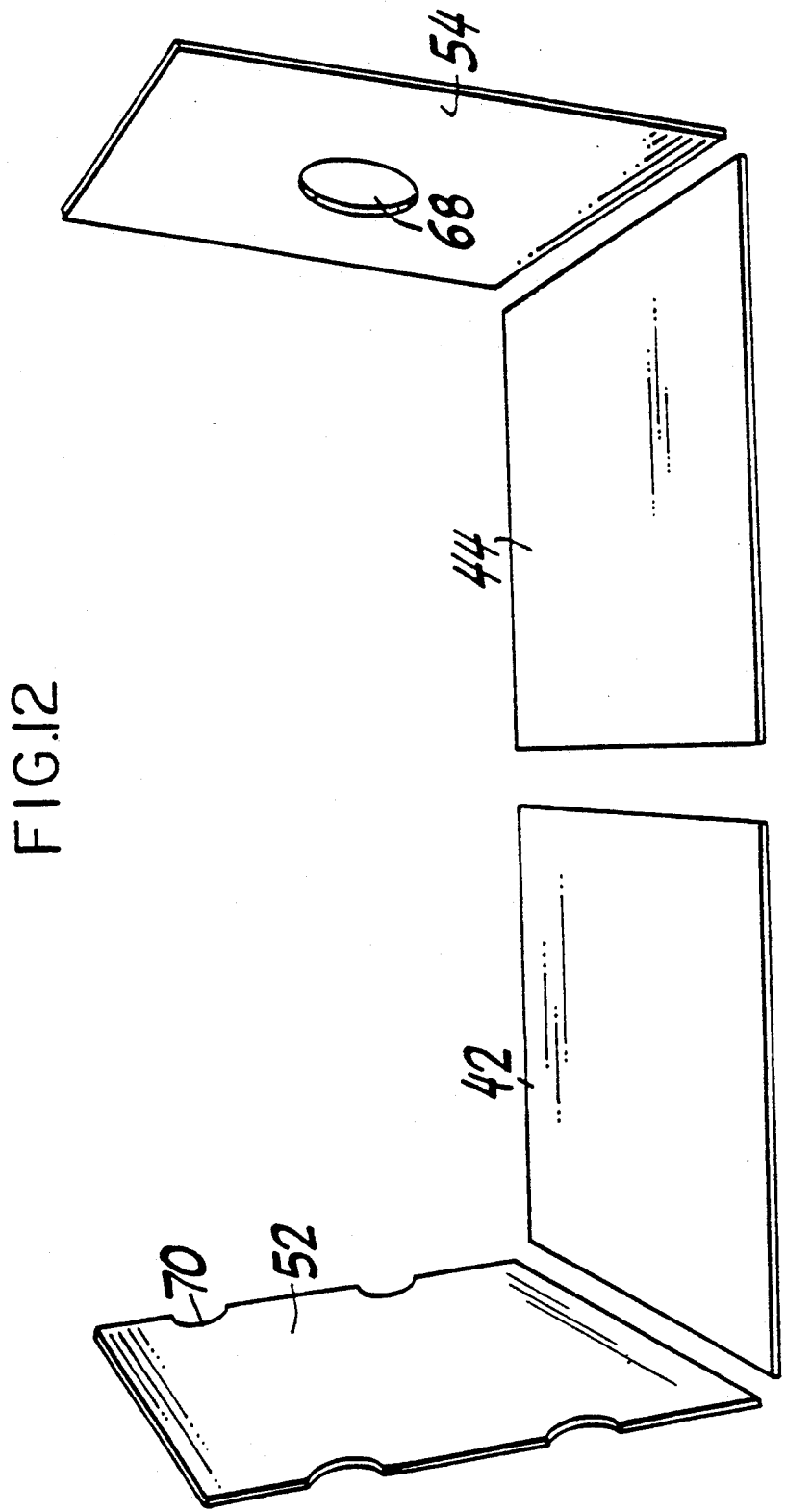
FIG. 12 is a perspective view of another embodiment of the package structure of the present invention.
Figure 13:
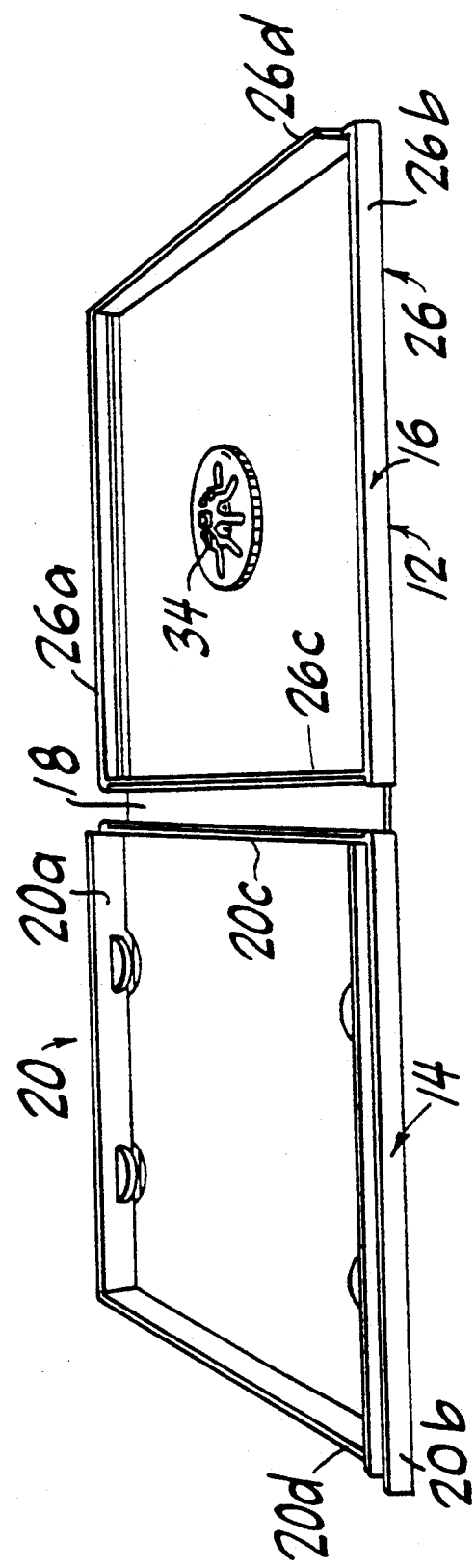
FIG. 13 is a perspective view of another embodiment of the paperboard structure of the present invention.

In yet another embodiment of the invention, the paperboard portion of the package may be formed of two or more separate blanks For example as shown in FIG. 12, the outer surfaces of the package can be formed by separate segments 42, 44, and the inner surfaces formed by separate segments 52, 54, or the outer surfaces of the package may be formed of one blank, with the inner surfaces formed of separate second and third blanks. In such an embodiment as shown in FIG. 13, the slots in the frame sections may not be necessary.

Finally, it should be understood that while the package has been described as having a folded paperboard body, it is within the scope of the invention to form the body out of any suitable, relatively flexible sheet material such as vinyl, or even thin metal, if desired for structural or esthetic purposes, combined with the relatively rigid frame.

Although the invention has been described and illustrated in detail, it is to be clearly understood that the same is by way of illustration and example, and is not to be taken by way of limitation. The spirit and the scope of the present invention are to be limited only by the terms of the appended claims.

We claim:

1. A folding package structure having a lid and a base, comprising:

a support frame including a lid section and a base section;

hinge means for connecting the lid and base sections together and for allowing the lid and base sections to be folded together when the package structure is closed;

a slot formed in an end of each of said lid and base sections opposite the hinge means; and a folded body of relatively flexible sheet material having a first segment attached to the lid section to form an outer surface of the package lid, a second segment attached to the base section to form an outer surface of the package base, a third segment attached to the lid section to form an inner surface of the package lid, and a fourth segment attached to the base section to form an inner surface of the package base, wherein the third and fourth body segments extend through the slots from the outside of the package to the inside.

2. A package structure according to claim 1, further including ledge means on the base and lid sections for partially blocking the slots, and in which portions of the body in the vicinity of the slots rest on the ledge means to provide support for the package surfaces.

3. A package structure according to claim 1, further including ledge means on the base and lid sections for partially blocking the slots, and in which portions of the third and fourth segments in the vicinity of the slots rest against the ledge means to provide support for the body.

4. A package structure according to claim 1, in which the body is folded at the slot in the lid section to define the boundary between the first and third segments, and folded at the slot in the base section to define the boundary between the second and fourth segments.

5. A package structure according to claim 4, in which the body includes a fifth segment located between the first and second segments which overlies, but is not attached to, the hinge means.

6. A package structure according to claim 5, in which the fifth segment is connected to the first segment by first and second transverse fold lines offset from each other on opposite faces of the fifth segment, and in which the fifth segment is connected to the second segment by third and fourth transverse fold lines offset from each other on opposite faces of the fifth segment.

7. A package structure according to claim 5, wherein the support frame includes a first wall forming the periphery of the base section and a second wall forming the periphery of the lid section, the first and second wall mating with each other when the package is closed to provide rigidity to the package structure, the peripheral inner margins of the first and second walls are recessed, in which the first segment of the body lies within the recess in the first wall and in which the second segment of the body lies within the recess in the second wall.

8. A package according to claim 7, in which the depth of the recesses in the first and second walls is greater than the thickness of the material comprising the body.

9. A package structure having a lid and a base, comprising:
 a rigid support frame including a lid section and a base section;
 hinge means for connecting the lid and base sections together and for allowing the lid and base sections to be folded together when the package structure is closed;
 a first wall forming a periphery of the base section;
 a second wall forming a periphery of the lid section, wherein the first and second walls mate with each other when the package is closed to provide rigidity to the package structure, peripheral inner margins of the first and second walls being recessed;
 a body of relatively flexible material having a first segment adhered to the lid section to form an outer surface of the package lid, a second segment adhered to the base section to form an outer surface of the package base, a third segment adhered to the lid section to form an inner surface of the package lid, and a fourth segment adhered to the base section to form an inner surface of the package base, wherein the first segment of the body lies within the recess in the first wall and the second segment lies within the recess in the second wall.

10. A package according to claim 9, in which the depth of the recesses in the first and second walls is greater than the thickness of the material comprising the body.

11. A package structure according to claim 1, in which the hinge means is comprised of an elongated plastic member located between the lid and base sections, and includes means for permitting the member to fold longitudinally in an area adjacent to the lid and base sections.

12. A package structure according to claim 11, in which the hinge means is a plastic strip molded integrally with the lid and base sections.

13. A package structure according to claim 11, including means for affixing the elongated plastic member to the lid and base sections to allow the lid and base sections to be folded together.

14. A package structure according to claim 11, in which the means for permitting the elongated plastic member to fold longitudinally comprises extended areas of reduced thickness of the member.

15. A package structure according to claim 1, in which the support frame further includes means located on the lid section for securing a printed document to be included in the package, and a spindle located in the base section of the package for securing a recording medium in the package.

16. A package structure according to claim 1, in which the lid and base sections each include a cut-out section for allowing the first and third body segments, and the second and fourth body segments to be secured to each other.

17. A package structure according to claim 1, in which the lid and base frame sections are solid pieces.

18. A package structure according to claim 1, in which the body includes a fifth segment which overlies, but is not attached to, the hinge means.

19. A package structure according to claim 1, in which the first and third segments of the body are adhered to each other and to the lid section, and in which the second and fourth segments of the body are adhered to each other and to the base section.

20. A package structure according to claim 19, in which the body includes a fifth segment which overlies, but is not attached to, the hinge means.

21. A package structure according to claim 20, in which the fifth segment of the body is connected to the first segment by first and second transverse fold lines offset from each other on opposite faces of the fifth segment, and in which the fifth segment of the body is connected to the second segment by third and fourth transverse fold lines offset from each other on opposite faces of the fifth segment.

22. A package structure according to claim 1, in which the body is formed of a folded paperboard blank.

23. A package structure according to claim 9, further comprising means located on the lid section for securing a printed document to be included in the package, and a spindle located in the base section of the package for securing a recording medium in the package.

24. A package structure according to claim 9, wherein the first, second, third and fourth segments are formed of separate paperboard blanks.

* * * * *